Aug. 14, 1951     F. Y. CARTER     2,564,421
FLOW CONTROL VALVE FOR REFRIGERATION SYSTEMS
Filed Aug. 8, 1947
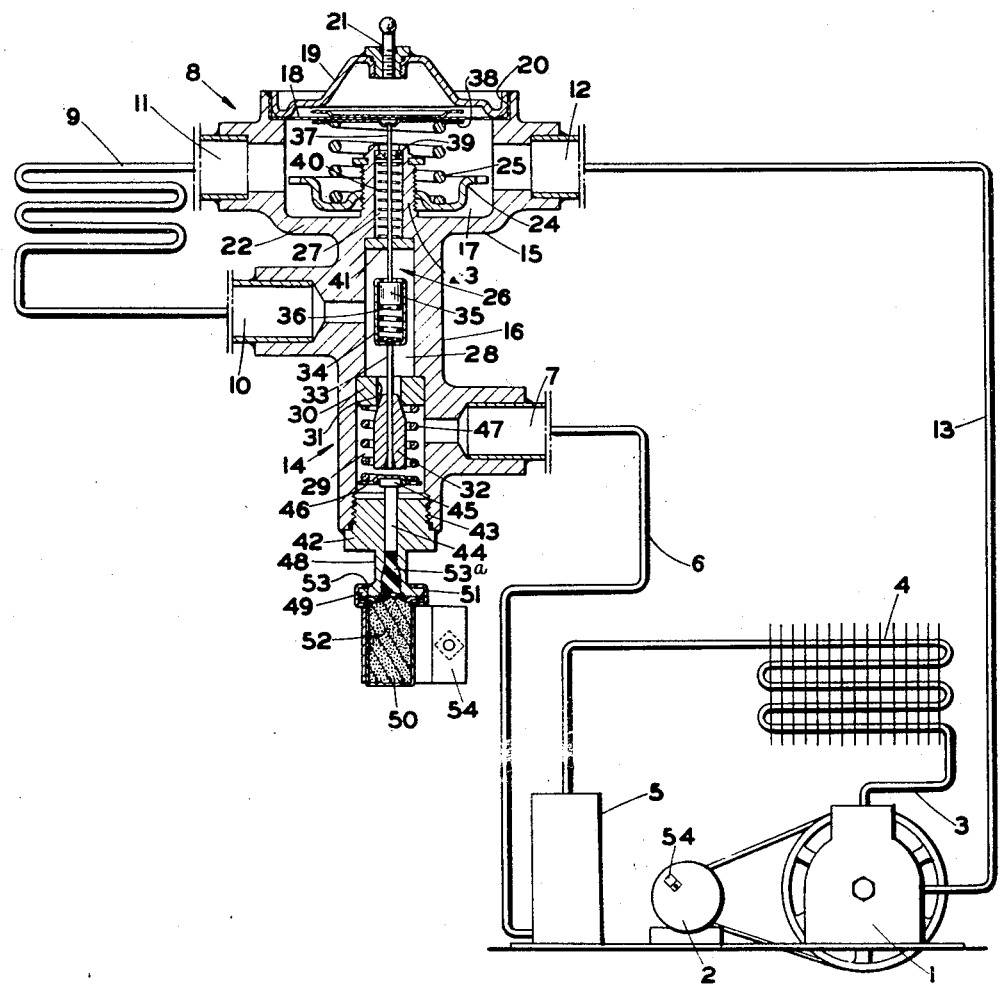
INVENTOR.
Franklyn Y. Carter
BY
Andrew K. Foulds
his ATTORNEY Patented Aug. 14, 1951

2,564,421

UNITED STATES PATENT OFFICE 2,564,421

FLOW CONTROL VALVE FOR REFRIGERATION SYSTEMS

Franklyn Y. Carter, Dearborn, Mich., assignor to Detroit Lubricator Company, Detroit, Mich., a corporation of Michigan Application August 8, 1947, Serial No. 767,633

1 Claim. (Cl. 62—127)

This invention relates to new and useful improvements in refrigerating systems.

One of the objects of this invention is to provide a refrigerating system having improved means for controlling flow of refrigerant.

Another object is to provide a motor driven refrigerating system having a refrigerant flow controlling valve and means to close said valve upon overloading of the motor.

Other objects will become apparent from time to time throughout the specification and claim as hereinafter related.

In the accompanying drawing, to be taken as a part of the specification, there is clearly and fully illustrated a preferred embodiment of this invention, in which drawing the figure is a diagrammatic view of a refrigerating system embodying the invention and showing a control valve in longitudinal cross-section, the valve being normally mounted on the motor but being broken away therefrom and enlarged for clarity of illustration.

Referring to the drawing by characters of reference there is a refrigerating system having a compressor 1 driven by a motor 2. From the high pressure side of the compressor 1 there is a conduit 3 leading to a condenser 4 which in turn is connected to a receiver 5. The receiver 5 is connected by a conduit 6 to an inlet port 7 of a suction line type thermostatic expansion valve 8. The expansion valve 8 discharges to an evaporator 9 from an outlet port 10. The valve 8 has a pressure chamber connected to the evaporator 9 by an inlet port 11. The outlet 12 from the pressure chamber is connected by a conduit 13 to the suction side of the compressor 1. The expansion valve 8 comprises a valve casing 14 which has an enlarged end portion 15 and a smaller body portion 16. The enlarged end portion 15 contains the cylindrical pressure chamber 17 therewithin which interconnects the inlet and outlet ports 11 and 12 respectively. The chamber 17 is closed and sealed at its outer end by a flexible diaphragm 18 which is held in place by a cup-shaped cover member 19 fitting in an annular recess 20 in the end portion 15. The space enclosed between the diaphragm 18 and cover member 19 is filled with a thermostatic fluid and acts as a thermostatic means for actuating the valve. The cover member 19 has a filler tube member 21 which is screw-threadedly connected thereto. Extending upward from the bottom wall 22 of the chamber 17 is a cylindrical projection 23 which is externally screw-threaded and carries a cup-shaped adjustment member 24. Positioned between the adjustment member 24 and the diaphragm 18 is a spring 25 which determines the force required to move the diaphragm 18 and which may be adjusted by rotation of the adjustment member 24. There is a longitudinal passageway 26 which extends from the chamber 17 through the cylindrical projection 23 and the valve body portion 16 for the length of the casing. The passageway 26 comprises three portions, a small portion 27 through the cylindrical projection 23, a larger central portion 28, and a large valve port portion 29. In the valve port portion 29 there is a valve seat member 30 which has a valve port 31 therein which cooperates with a valve member 32. The passageway portion 28 communicates with the outlet port 10 and the passageway portion 29 communicates with the inlet port 7 with the valve member 32 controlling flow of refrigerant between the ports 7 and 10. The valve member 32 is connected by a valve stem or rod 33 to a hollow cylindrical member 34 which carries therein a longitudinally movable piston 35 whose motion is opposed by a spring 36. The piston 35 is connected by a rod or stem 37 extending from the central passageway portion 28 through the small passageway portion 27 to a plate member 38 positioned between the spring 25 and diaphragm 18 and movable with the diaphragm 18. In the end of the small passageway portion 27 toward the chamber 17 is positioned packing material 39 surrounding the stem 37 and held in position by a spring 40 which is held under compression at its other end by a disc member 41 closing the end of the central passageway 28. The disc member 41 has a small aperture therethrough for longitudinal movement of the stem 37. Closing the open end of the valve port passageway portion 29 is a cylindrical plug member 42 which is screw-threadedly held in position as at 43. The plug member 42 has a longitudinal bore therethrough in which is positioned a plunger member 44. The plunger 44 has an enlarged head portion 45 which carries a dish-shaped member 46 and which bears against a spring 57 positioned between the dish-shaped member 46 and the valve seat disc member 30. The plug member 42 has a smaller portion 48 and a flange portion 49. There is a hat-shaped member 50 which has its flanged edge portion fitted against the flange portion 49 and which is held thereagainst by an annular clamping flange member 51. The hat-shaped member 50 is hollow and contains a thermal expansive material 52. There is a flexible diaphragm 53 of an elastomeric material positioned between the open end of the hat-shaped member 50 and the bore of the plug member 42. In the bore of the plug member 42 between the plunger 44 and the diaphragm 53 is an elastic plug 53ᵃ which is operable to transmit thrust therebetween. The valve 8 is mounted to the motor 2 by the hat-shaped member 50 and is held in position by a metal strap member 54 so that the thermal expansive material 52 may respond to the heat of the motor. The valve 8 is shown broken away from the motor 2 and enlarged for clarity of illustration.

In operation this system functions as a conventional mechanical refrigeration system. The gaseous refrigerant is compressed by the compressor 1, condensed in the condenser 4, and stored in the liquid refrigerant receiver 5. The liquid refrigerant flows from the receiver 5 to the expansion valve 8 where it is throttled in passing to the evaporator 9 and is returned to the suction side of the compressor 1 through the chamber 17 of the expansion valve 8 and the suction line conduit 13. The expansion valve 8 is a "suction line" valve, that is, the thermostatic fluid enclosed by the diaphragm 18 and cover member 19 is responsive to the temperature of the refrigerant fluid on the suction side of the compressor 1 and the diaphragm 18 is responsive to the differential of pressure thereacross. The movement of the pressure responsive diaphragm in response to the differential of pressure thereacross moves the valve member 32 toward or away from the valve seat 30 in order to keep the evaporator 9 completely refrigerated. As was described heretofore, the hat-shaped member 50 which encloses the thermal expansive material 52 is secured to the motor 2 by a strap member 54 so that the member 50 will be responsive to the temperature of the motor 2. If the motor 2 becomes overloaded and overheated the member 50 will be heated thereby and the thermal expansive material 52 will expand. The expansion of the thermal expansive material 52 will cause the diaphragm 53 to move and thus move the elastic plug 53ᵃ and the plunger 44. As the plunger 44 moves the spring 47 is compressed until disc member 46 engages the valve member 32 and begins to move the same toward the valve seat 30. Movement of the valve member 32 toward its seat will cause the valve stem portions 33 and 37 to be compressed resulting in movement of the piston 35 in the cylinder 34 compressing the spring 36. It is seen then that in normal operation the expansion valve 8 functions as a conventional "suction line" valve but if the motor becomes overheated the member 50 and thermal expansive material 52 will cause the plunger 44 to move forcing the valve member 32 to closed position by compressing the valve stem portions 33 and 37 resulting in movement of the piston 35 in the cylinder 34 against the spring 36 compressing the same. The closing of the valve member 32 by the member 50 in response to the overheating of the motor 2 will cause increased throttling of the refrigerant passing through the valve 8 and thus reduce the load on the motor 2 permitting the same to cool.

What is claimed and is desired to be secured by Letters Patent of the United States is:

A refrigeration expansion valve, comprising a valve body member having an elongated portion terminating at a chamber portion at one end of said member, a passageway extending longitudinally through said elongated portion and opening at one end into the chamber in said chamber portion, said passageway having an intermediate portion between spaced annular shoulders, an outlet passageway leading from said intermediate portion, a closure member seating against one of said shoulders and having a central aperture therethrough, a valve seat member seating against the other of said shoulders and having a valve port, a valve member positioned on the opposite side of said seat member from said intermediate portion and cooperable with said valve port, a thermostatic element having a movable wall member closing said chamber and concentrically overlying said passageway, a valve stem extending through said central aperture and said valve port and operatively connecting said movable wall to said valve member, said valve stem comprising two portions, a hollow cylindrical member one one of said portions and positioned in said intermediate pasageway portion, a piston on the other of said portions and reciprocally movable in said cylindrical member, a spring positioned within said cylindrical member and opposing compressive movement of said piston, a thermostatic power element having a plug member closing the other end of said passageway, a plunger reciprocal in said plug member and spaced from said valve member and operable to engage the same upon predetermined movement by said power element, said power element being operable upon further movement of said plunger after engagement with said valve member to move said valve member to closed position; and said spring; piston, and cylindrical member being operable as a lost motion means to permit relative movement by said valve member and said first-named thermostatic element so that said valve member may be held closed independently of the operation of said first-named thermostatic element.

FRANKLYN Y. CARTER.

REFERENCES CITED

The following references are of record in the file of this patent:

UNITED STATES PATENTS

| Number | Name | Date |
| --- | --- | --- |
| 1,988,776 | Berghoefer | Jan. 22, 1935 |
| 2,297,872 | Carter | Oct. 6, 1942 |
| 2,335,824 | Dillman | Nov. 30, 1943 |
| 2,366,188 | Gibson | Jan. 2, 1945 |
| 2,400,334 | Berry | May 14, 1946 |
| 2,400,335 | Dodson | May 14, 1946 |
| 2,484,156 | Dube et al. | Oct. 11, 1949 |